Feb. 5, 1963  W. M. GEARHART ET AL  3,076,718
LACQUER EXTENDER
Filed Dec. 8, 1958
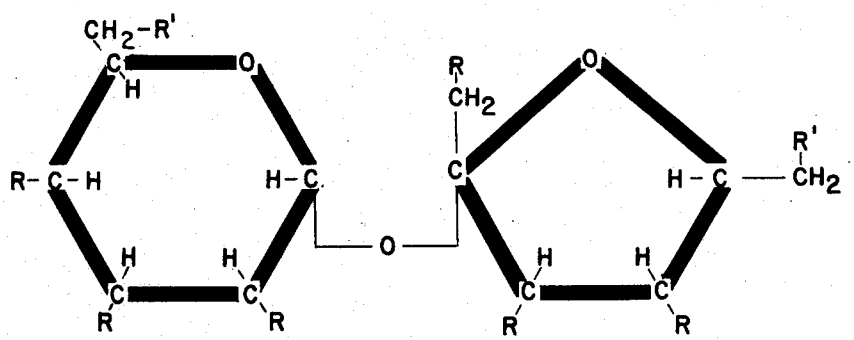
MOLECULAR REPRESENTATION OF SAIB
WILLIAM M. GEARHART
FREDERICK M. BALL
INVENTORS
BY
ATTORNEYS

United States Patent Office 3,076,718
Patented Feb. 5, 1963

3,076,718
LACQUER EXTENDER
William M. Gearhart and Frederick M. Ball, Kingsport, Tenn., assignors to Eastman Kodak Company, Rochester, N.Y., a corporation of New Jersey
Filed Dec. 8, 1958, Ser. No. 778,698
2 Claims. (Cl. 106—180)

This invention concerns an extender for lacquer and hot melt compositions, more particularly the use of sucrose acetate isobutyrate as a film former extender.

Cellulose esters and various polymeric materials are used widely as film formers in lacquers for a great number of purposes such as wood finishes, automobile coatings, and the like. However, it has been desirable to modify these lacquers including hot melt coating compositions by adding other ingredients in order to achieve economy, adhesion, higher non-volatile content without sacrifice of viscosity, to soften or flexibilize, reduce melting point, or to change the system in any other respect.

Usually when modification of the fundamental film formers is carried out, the film former takes on in a large measure, the features of the modifying material. Thus, if a brittle resin is added, the system quickly loses flexibility. If a low molecular weight fluid plasticizer is added, the film former quickly flexibilizes and loses tensile strength. Accordingly, a modification of cellulose derivative lacquers, for instance, has been difficult to achieve without loss of some desirable characteristics.

We have now discovered that sucrose acetate isobutyrate can be used as a modifier for lacquers without appreciably reducing film hardness or tensile strength of the basic film former in the manner that many additives in the same molecular weight range do. This is the main virtue. Further sucrose acetate isobutyrate is compatible with almost all important film formers and the behavior mentioned is characteristic with all of them, in varying degrees.

One object of this invention is to provide a method of extending the film former in lacquer and hot melt compositions by the addition of sucrose acetate isobutyrate. A further object is to provide a method of modifying lacquer compositions which increases the solids content without affecting the desirable characteristics of the lacquer coating.

In carrying out our invention, we use a sucrose acetate isobutyrate having from 1 to 6 acetyl groups (R') and from 2 to 7 isobutyryl groups (R) per sucrose unit as shown in the drawing of a molecular representation of sucrose acetate isobutyrate (SAIB). In modifying the film former an amount up to 90% may be used based on the film former and varying with the particular film former. With cellulose nitrate the amount can be as high as 90%, but with ethyl cellulose the maximum ratio is approximately 70% based on the weight of the film formers with which this material may be used. Other film formers that respond similarly are cellulose acetate, cellulose acetate butyrate, chlorinated rubber, polymethacrylic esters, polyvinyl copolymers, epoxies, polyacrylic rubber, etc.

The following examples of lacquer formulations are intended to illustrate our invention but are not intended to limit it in any way:

EXAMPLE 1

Lacquer for Wood

| | Weight percent |
|---|---|
| ½ sec. RS Nitrocellulose (70%) | 14.3 ±8 |
| Sucrose acetate isobutyrate | 13.8 ±8 |
| Dibutyl phthalate | 1.2 ±1 |
| Methyl ethyl ketone | 22.5 |
| Isobutyl acetate | 30 |
| Toluene | 11.25 |
| Acetone | 6.95 |
| | 100 |

Features:
  High non-volatile content at low viscosities
  Excellent cold check resistance
  High film hardness at high modification
  Good permanence

EXAMPLE 2

Lacquer for Paper

| | |
|---|---|
| ½ sec. RS Nitrocellulose (70%) | 16.3 ±10 |
| Sucrose acetate isobutyrate | 45.6 ±25 |
| Methyl ethyl ketone | 12.9 |
| Isobutyl acetate | 17.2 |
| Toluene | 6.45 |
| Ethyl alcohol (95%) | 1.55 |
| | 100 |

Features:
  High non-volatile content with solvent economy
  Good adhesion
  Simplified formula
  High gloss
  Heat seal possible

EXAMPLE 3

Lacquer for Cloth

| | |
|---|---|
| 5 sec. RS Nitrocellulose (70%) | 14 ± 5 |
| Sucrose acetate isobutyrate | 19.6 ±10 |
| Dibutyl phthalate | 3.26± 2 |
| Methyl ethyl ketone | 19.6 |
| Isobutyl acetate | 26.04 |
| Toluene | 9.8 |
| Ethyl alcohol (95%) | 7.7 |
| | 100 |

Features:
  High modification with low viscosity increase
  Good film hardness and flexibility
  Low temperature flexibility

EXAMPLE 4

Lacquer for Metal

| | |
|---|---|
| ½ sec. RS Nitrocellulose (70%) | 8.6±4 |
| Sucrose acetate isobutyrate | 14 ±8 |
| Methyl ethyl ketone | 24 |
| Isobutyl acetate | 32 |
| Toluene | 12 |
| Ethyl alcohol (95%) | 9.4 |
| | 100 |

Features:
- Good adhesion to metal surfaces
- Excellent resistance to water immersion
- High non-volatile content
- Improved film hardness

EXAMPLE 5

*Lacquer for Plastic*

| | Weight percent |
|---|---|
| ½ sec. cellulose acetate butyrate | 5 ±4 |
| Sucrose acetate isobutyrate | 10 ±6 |
| Toluene | 25.5 |
| Ethyl alcohol (95%) | 8.5 |
| Acetone | 34 |
| Butyl Cellosolve | 17 |
| | 100 |

Features:
- Good adhesion to polystyrene, cellulose esters, and polyolefin plastics
- High degree of modification
- Light color

EXAMPLE 6

*Gravure Applied Lacquer for Paper*

| | |
|---|---|
| ½ sec. RS Nitrocellulose (70%) | 9.15± 5 |
| Sucrose acetate isobutyrate | 21.35±15 |
| Toluene | 24.9 |
| Ethyl alcohol (95%) | 10.1 |
| Acetone | 30.2 |
| Isopropyl acetate | 4.3 |
| | 100 |

Features:
- Extremely rapid dry
- Glossy film that protects ink from smudging
- Very high thickness at low viscosity

EXAMPLE 7

*Holt Melts*

| | Paper | Sealant | Peelable | Coatings |
|---|---|---|---|---|
| Half-Second cellulose acetate butyrate | 40 | 25 | | |
| Cellulose acetate butyrate | | | 30 | |
| Sucrose acetate isobutyrate | 60 | 70 | 70 | 30 |
| Plasticizer, dioctyl phthalate | | 5 | | 10 |
| Ethyl Cellulose | | | | 40 |
| Mineral Oil | | | | 20 |
| | 100 | 100 | 100 | 100 |

Hot melt coatings:
- Excellent flexibility
- High modification without increasing tack
- Good adhesion at high temperatures
- Absence of fuming
- Single component modifier for cellulose acetate butyrate hot melts
- Outstanding heat color stability Peelable plastic coatings:
- One component modifier
- Light color
- Excellent resistance to exudation

EXAMPLE 8

| | Weight, percent | Plus or minus, percent |
|---|---|---|
| Ethyl Cellulose | 15 | 7 |
| Sucrose acetate isobutyrate | 15 | 7 |
| Toluene | 35 | |
| Ethyl Alcohol | 35 | |

The features of this finish are that it has high non-volatile content with moderately good toughness and flexibility.

EXAMPLE 9

| | Weight percent |
|---|---|
| Chlorinated rubber | 15 |
| Castor oil | 5 |
| Sucrose acetate isobutyrate | 15 |
| Toluene | 65 |

EXAMPLE 10

A gasket composition may be formulated for a hot melt application having the following composition:

25 parts cellulose acetate butyrate
70 parts sucrose acetate isobutyrate
5 parts of a polymeric plasticizer obtained by reacting neopentyl glycol, adipic acid and 2-ethylhexanol Satisfactory sealing was obtained on screw type can closures by coating the inside of the cover. The cover could be removed by exerting a relatively low torque.

EXAMPLE 11

A similar satisfactory gasket composition was made by adding 5 parts paraffin to the composition of Example 10.

EXAMPLE 12

Cellulose acetate butyrate intended for use in dry molding operations was prepared by mixing 50 grams sucrose acetate isobutyrate with 100 grams cellulose acetate butyrate for approximately 15 minutes in a sigma blade mixer at a temperature of 50° C. After mixing the batch was finally processed on a two-roller rubber mill at a temperature of 150° C. and then cut into pellets, approximately ⅛" square. The resulting material had exceptional flow and moldability characteristics.

The addition of sucrose acetate isobutyrate to coatings results in many improvements in the coating itself: inasmuch as a high solids content is provided at low solution viscosity, fewer coats of the material are required to obtain a given thickness of coating. The additive has a high molecular weight, but compact molecule which results in remarkable permanence in the coatings to which it is added since it does not exude; it has a high boiling point and low volatility; the adhesion of many coating systems is improved by its incorporation; it will not turn green in contact with bronze powders.

Sucrose acetate isobutyrate is compatible with many polymers so that it may be added to coating compositions wherever the above requirements are desired, especially since the proportions are not necessarily critical but are subject to wide variations. For instance, a wood lacquer may be formulated as in Example 1 with from 6.3 to 22.3% cellulose nitrate and a similar variation in sucrose acetate isobutyrate. The plasticizer may be replaced by dioctylphthalate or tricresyl phosphate or another plasticizer by varying the proportions between ½ to 3%. The solvents may be varied not only in amount but also in type. Pigments may be added for color or waxes and slip agents added to improve mar resistance.

Coatings containing sucrose acetate isobutyrate may be used as finishes for wood, paper, cloth, metals, plastics and cellophane as well as other surfaces. Hot melt coatings using sucrose acetate isobutyrate may be applied to various surfaces such as paper, metal, fabric, etc. Sucrose acetate isobutyrate may also be used in the field of heat transfer because of its low degree of fuming. It can be used in printing in the modification of lacquer type inks and may be used in varnishes and wax emulsions to obtain an extension of the properties of the film former itself. It can also be used in cellulosic resins for heat seal adhesives.

The preparation of sucrose acetate isobutyrate is disclosed in U.S. patent application, Serial No. 731,890, filed April 30, 1958, in the names of Touey and Davis. Said application has now matured into U.S. Patent No. 2,931,802.

We claim:
1. A coating composition consisting essentially of ethyl cellulose and 5–70% based on the weight of the ethyl cellulose of sucrose acetate isobutyrate having 1–6 acetyl groups and 2–7 isobutyryl groups per sucrose unit, and a volatile organic solvent.

2. A coating composition consisting essentially of chlorinated rubber and 5–70% based on the weight of the chlorinated rubber of sucrose acetate isobutyrate having 1–6 acetyl groups and 2–7 isobutyryl groups per sucrose unit, and a volatile organic solvent.

References Cited in the file of this patent

UNITED STATES PATENTS

| | | |
|---|---|---|
| 2,356,745 | Barth et al. | Aug. 29, 1944 |
| 2,381,247 | Barth et al. | Aug. 7, 1945 |
| 2,441,555 | Barth et al. | May 18, 1948 |
| 2,628,249 | Bruno | Feb. 10, 1953 |
| 2,931,802 | Touey et al. | Apr. 5, 1960 |

OTHER REFERENCES

Zief: U.S. Department of Agriculture, "Saturated Esters of Sucrose," September 1951, AIC–309 (4 pages).